United States Patent [19]

Mikan

[11] Patent Number: 4,731,530
[45] Date of Patent: Mar. 15, 1988

[54] JOYSTICK CONTROL HAVING OPTICAL SENSORS

[76] Inventor: Peter J. Mikan, 15 Lakeside Dr., Milford, Conn. 06460

[21] Appl. No.: 853,980

[22] Filed: Apr. 21, 1986

[51] Int. Cl.⁴ ............................................... G01D 5/34
[52] U.S. Cl. ............................ 250/229; 250/231 SE; 250/211 K; 250/221; 340/709
[58] Field of Search .................. 340/709; 250/211 K, 250/231 SE, 237 G, 229, 221, 231 GY; 33/1 M; 338/128

[56] References Cited

U.S. PATENT DOCUMENTS

| | | | |
|---|---|---|---|
| 3,649,840 | 3/1972 | Thorn et al. | 250/211 K |
| 4,103,155 | 7/1978 | Clark | 250/231 SE |
| 4,180,805 | 12/1979 | Burson | 340/709 |

FOREIGN PATENT DOCUMENTS 0729583  5/1980  U.S.S.R. ............... 340/709

*Primary Examiner*—Edward P. Westin
*Assistant Examiner*—Charles Wieland
*Attorney, Agent, or Firm*—H. Gibner Lehmann; K. Gibner Lehmann

[57] ABSTRACT

An electromechanical control for use with a joystick lever which swivels along x and y axes simultaneously. The control has a light source and two light sensitive phototransistors. The light source emits a beam which is split into two parts. A light control sector is pivoted on the base, and mechanically linked to the lever. The sector is disposed in the paths of the two parts of the split beam, and has two arcuate translucent portions, each translucent portion being on its own radius and the portions having a common center. One part of the beam passes through one translucent portion and the other part of the beam passes through the second. The phototransistors are disposed on that side of the translucent portions opposite the location of the light source. The one translucent portion has a graduated opacity along its length, such that the light arriving at one phototransistor varies as the sector pivots by movement of the lever. The other translucent portion has a substantially monotonous or constant opacity, such that the beam part passing therethrough does not vary with movement of the lever. The arrangement is such that only when the lever is in its exact center position with respect to the base, is the opacity of the one translucent portion at the location of its phototransistor the same as that of the uniform opacity of the other translucent portion, whereby a precise indication of the said center position can be obtained by measurement of the relative outputs of the phototransistors.

26 Claims, 8 Drawing Figures

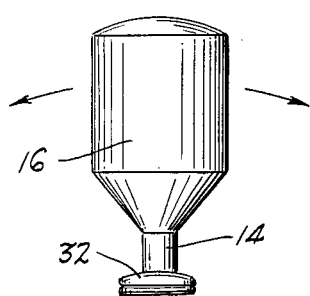
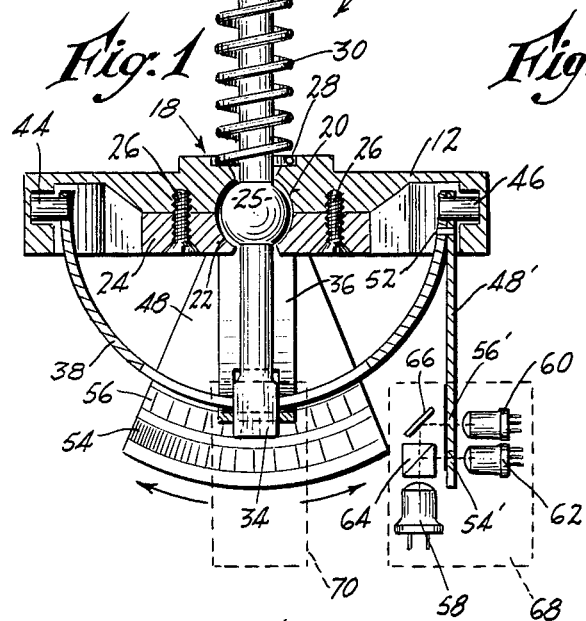
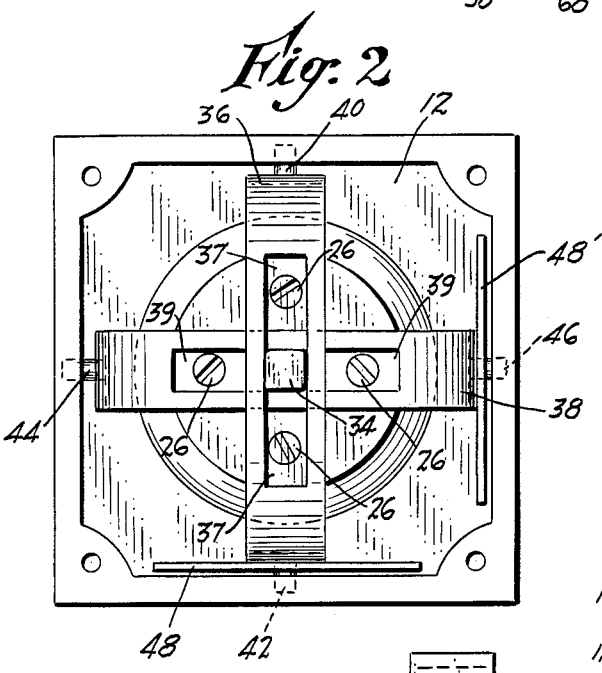
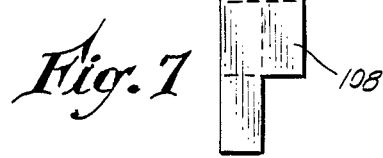
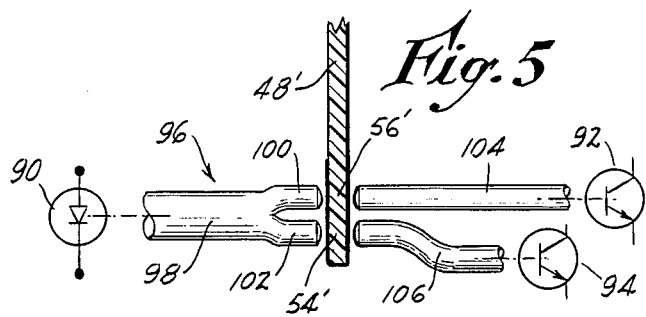
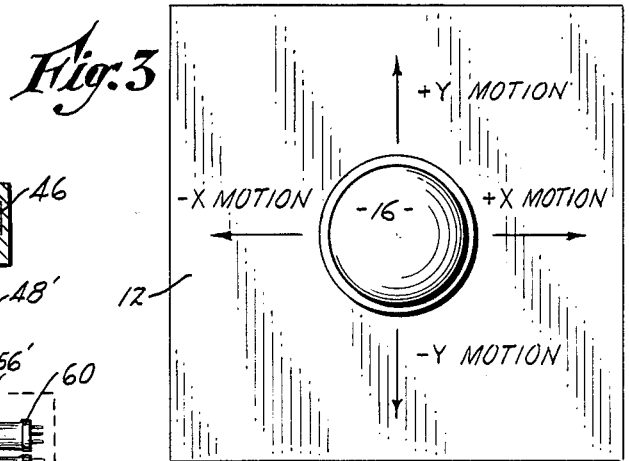
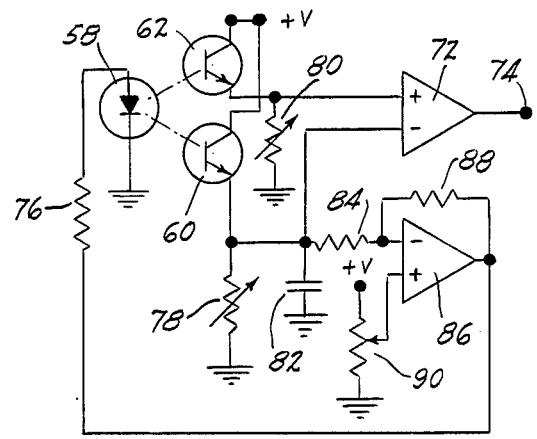
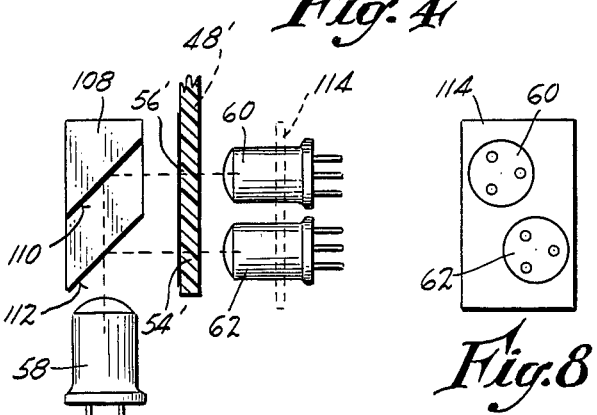

JOYSTICK CONTROL HAVING OPTICAL SENSORS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates generally to joystick devices of the kind having a swivel mounted manually-engageable lever capable of movement from a center position to any one of a number of angular positions lying within a theoretical upwardly-extending conical surface, for controlling the operation of various types of electronic or electromechanical equipment.

2. Description of the Related Art Including Information Disclosed Under 37 CFR §§ 1.97–1.99

In the past a number of arrangements have been proposed and produced for converting the mechanical movements of a pivoted control lever into electrical output signals suitable for controlling various kinds of electrical circuits or electro-mechanical devices.

U.S. Pat. No. 4,284,885 issued Aug. 18, 1981 illustrates one such device, described in the patent as an optical potentiometer. A lever which is pivoted on a base carries a disk-like member having two arcuate portions of variable opacity. The portions lie along a common radius, and there is a space between their adjacent ends, to provide a "dead" spot or dwell. A light bulb is mounted on one side of the disk-like member, with a phototransistor on the opposite side. As the disk moves with the lever, the amount of light received by the phototransistor varies with the lever's position, producing an input/output response curve as shown in FIG. 9 of the patent.

While such an arrangement is relatively simple in its construction, variations in the output intensity of the source, as well as in the response of the phototransistor have been found to introduce serious errors. These variations can take the form of changes in the devices resulting from aging, clouding of the translucent portion from dirt, dust, etc., or from deterioration of the material of which the translucent portion is constituted. In addition, major response deviations have been found to occur with variations in temperature. In particular, the drift associated with incandescent bulbs, light-emitting diodes and transistors is well known, and recognized as a significant problem which has to be considered in any electronic design incorporating such devices.

U.S. Pat. No. 4,514,600 issued Apr. 30, 1985 shows a joystick construction which employs four contact pads that are adapted to be engaged by a spring which is carried by a manually-engageable lever swivel-mounted on a base. Through the use of four pads, movement of the lever toward any one of eight 45° segments can be detected, as indicated by the markings on the face of the housing in FIG. 1 of the patent.

A considerably more sophisticated joystick control is illustrated in U.S. Pat. No. 4,161,726 issued July 17, 1979. This patent discloses a "digital" joystick which incorporates pivotally-mounted printed circuit board sectors that move with the lever and have defined contact areas adapted to be engaged by projecting fingers on cooperable stationary insulating boards which are disposed parallel to but radially outside the moving circuit boards. The arrangement of the conductors on the pivoted boards, together with the locations of the fingers on the stationary insulating boards, determines the response of the device as the lever is actuated. Depending on the particular geometry of the contacting areas, relatively complicated de-coding circuitry is required in order to provide the desired output signals.

Still other types of previously known joysticks have incorporated carbon composition or wire-wound potentiometers mounted at right angles, and adapted to be turnably driven in response to movement of the joystick lever. In general this type of arrangement suffered from the following disadvantages. Carbon potentiometers are notoriously noisy, and usually exhibit contact inconsistencies over much of the range of adjustment. In addition they tend to wear easily. This problem is especially troublesome with joystick controls, since the potentiometer is usually being driven over a very small portion of its range, namely that near its center of travel. The repeated transitions over this central area eventually lead to erratic operation. Wire wound potentiometers suffer some of the same drawbacks as regards wear and noise. In addition, the resolution is often limited, since the wiper contact moves in steps wherein adjacent turns of the toroidal coil are successively bridged.

Finally where it is desired to employ a joystick in an industrial application, the use of mechanical contacts can constitute a distinct disadvantage, as for example where there are present various gases or vapors that are potentially explosive. Such devices also present problems in installations where there exists other relatively sensitive equipment in the vicinity of the joystick, where the make-and-break nature of a mechanical potentiometer can generate static or noise (radio frequency interference) that adversely affects the operation of such equipment.

SUMMARY OF THE INVENTION

The above disadvantages and drawbacks of prior joystick controls are obviated by the present invention, which has for an object the provision of a novel and improved joystick control which is especially simple in construction, reliable in operation, and which incorporates unique compensation means and circuitry that greatly improves the accuracy and significantly reduces problems with errors caused by drift, component aging, temperature variations, and other variables.

A related object of the invention is to provide an improved joystick control as above set forth, wherein the mechanical center of the joystick lever can be determined with a high degree of accuracy, reliability and repeatability, thus enabling improved performance to be realized.

Still another object of the invention is to provide an improved joystick control as above characterized, which involves no make-and-break contacts or noisy potentiometers, thereby eliminating problems with wear, electrical interference, explosion hazards, etc.

Yet another object of the invention is to provide an improved joystick control of the kind indicated where essentially infinite resolution is achievable, thereby resulting in improved performance and accuracy.

A still further object of the invention is to provide an improved joystick control as outlined above, wherein there is made possible the option of remotely locating amplifier and indicator circuitry associated with the joystick, through the use of light-transmitting fiber optic cable.

A further object of the invention is to provide an improved joystick control in accordance with the foregoing, wherein the number of moving parts is reduced to an absolute minimum, thereby reducing manufacturing cost, simplifying assembly, and improving reliability.

Other features and advantages will hereinafter appear.

In accomplishing the above objects the invention provides a joystick control comprising in combination a lever, means mounting the lever for swivelling movement in the directions of x and y axes, an energy source providing a beam of radiant energy, and means for dividing the beam into two parts. Means are provided, responsive to movement of the lever in a direction of one of said axes, for varying the intensity of one of the beam parts between lower and higher values, and additional means responsive to movement of the lever in the same direction, for effecting from the other of the beam parts, a reduced-energy beam of predetermined, constant or monotonous value. The intensity-varying means is adapted to produce, when the lever is centralized with respect to the one axis, a beam of intermediate intensity having solely one fixed relationship to the intensity of the reduced-energy beam.

The invention further provides an electromechanical control for producing an electrical output signal that varies as a function of the angular position of a manually engageable lever, comprising in combination a base and means pivotally mounting the lever on the base, a source providing a beam of radiant energy, a first and a second detector means, each being adapted to receive a part of the beam, and means mechanically coupled to the lever, for modulating the part of the beam received by one detector means such that the energy received by the latter varies between a maximum and minimum value as the manually engageable lever is operated from one position through a center position and toward an opposite position with respect to the base, and for modulating that part of the beam which is received by the other detector means such that the energy received by the latter remains constant at a value between the maximum and minimum values. The response of the one detector means can thus be made substantially equal to that of the said other detector means when the manually engageable lever is disposed precisely at its center position, thereby providing high accuracy and repeatability in the control function of the circuit.

BRIEF DESCRIPTION OF THE DRAWINGS

FIG. 1 is a vertical section of the improved joystick control of the invention, particularly illustrating a base, a lever, a swivel mounting for the lever, two sectors operated by the lever, and a light source and sensing devices associated with one of the two sectors.

FIG. 2 is a bottom plan view of the joystick control of FIG. 1, with the light source and sensing devices thereof omitted, for clarity.

FIG. 3 is a top plan view of the joystick control of FIGS. 1 and 2.

FIG. 4 is a schematic circuit diagram of the light source and sensing devices of FIG. 1, and further including amplifier circuitry associated therewith.

FIG. 5 is a fragmentary edge view of alternate forms of light source and sensing devices capable of substitution for those shown in FIG. 1, this construction constituting another embodiment of the invention.

FIG. 6 is a fragmentary edge view of yet another type of light source and sensor arrangement incorporating a mirror and two sensing devices, this configuration being capable of substitution for those shown in FIG. 1 and constituting still another embodiment of the invention.

FIG. 7 is a left end elevation of a mirror portion of the arrangement of FIG. 6, and FIG. 8 is a fragmentary right side elevation of a mounting arrangement for the two sensing devices shown in FIG. 6.

DESCRIPTION OF THE PREFERRED EMBODIMENTS

Referring first to FIG. 1 there is illustrated a joystick construction generally designated by the numeral 10, comprising a base plate 12 adapted to be mounted on a supporting structure (not shown) such as a housing or chassis, a manually operable lever 14 having a knob 16 to facilitate manipulation by an operator, and a swivel joint 18 enabling the lever 14 to be swiveled from its center or vertical position shown in FIG. 1, to any one of a number of angular positions with respect to the swivel joint. This swivel joint is at the point of intersection of two perpendicular axes labelled x and y in FIG. 3.

The base plate 12 has a semi-spherical recess 20 on its underside, which together with a complementary semi-spherical recess 22 in an adjoining abutment plate 24, form a generally spherical socket. The abutment plate 24 is affixed to the base plate 12 by four screws 26 shown in FIG. 2. The socket 20, 22 receives a ball member 25 carried by the lever 14, the ball member and socket constituting the swivel joint. As shown, the upper surface of the plate 12 has a circular recess 28 which constitutes a seat to receive the lower end of a compression spring 30. The lever 14 has a collar 32 adjacent the knob 16, constituting a seat for the upper end of the spring 30. By such arrangement the lever 14 is biased upwardly with respect to the base plate 12 and into engagement with the walls of the one semi-spherical recess 20, thus eliminating looseness in the joint between the lever 14 and base plate 12. The spring also automatically returns the lever to its vertical position in the absence of a manually applied force.

The lowermost end of the lever 14 has a square head 34, as shown particularly in FIGS. 1 and 2. A pair of semi-circular quadrants or swivel members 36, 38 is provided, having slots 37, 39 which each have opposite parallel side walls adapted to engage the opposite surfaces respectively of the square head 34 with a sliding fit. As will be readily understood, lateral movement of the square head of the lever 14 will cause swiveling of only one of the members 36, 38 if the lever moves parallel to one of the x or y axes, whereas it will give rise to swiveling of both members 36, 38 if movement of the lever 14 is along a path transverse to these axes. The members 36, 38 are carried by short studs 40, 42 and 44, 46 respectively located at their opposite ends. The studs are received in recesses in the underside of the base plate 12, the studs and recesses together constituting bearings for the members 36, 38 as shown in FIGS. 1 and 2.

In accordance with the present invention there are provided novel and improved light-control members or sectors associated with the swivel members 36, 38, these being illustrated in FIGS. 1 and 2 and designated 48 and 48' respectively. The sectors 48, 48' are preferably of transparent material, with surface etching to produce translucent portions as explained below. Each of the light control members 48, 48' is rigidly connected with its respective swivel member 36, 38 by means of rivets, one of which is illustrated in FIG. 1 and designated 52. Thus, the light control members 48, 48' move with the respective swivel members 36, 38, the latter constituting a linkage between the lever 14 and light control members 48, 48'.

Further by the invention, each member or sector 48, 48' has two arcuately-shaped translucent portions, the translucent portions of sector 48 being shown in FIG. 1 and being designated 54 and 56. The corresponding translucent portions of the sector 48' are labelled 54' and 56'. The portion 54 has a variable opacity along its length, being less translucent at its left side in this figure and becoming more translucent as the portion is traversed to the right. The portion 54 has a constant radius, just inside the outer edge of the sector. The additional portion 56 has a radius less than that of the first portion and has a monotonous or uniform opacity. The sector or light-control member 48' is substantially identical in construction to that of sector 48. As best shown in FIG. 1, a light source, preferably a light-emitting diode 58, is disposed at one side of the sector 48', and a pair of phototransistors 60, 62 mounted at the opposite side thereof. The mountings for the diode and phototransistors are not illustrated in this figure for clarity, but are rigid with respect to a housing (not shown) on which the base plate 12 is mounted.

The phototransistor 60 is disposed in alignment with the portion of uniform opacity of the light control member 48' (corresponding to portion 56 of the light control member 48), whereas the phototransistor 62 is aligned with the portion 54' of graduated opacity (corresponding to portion 54 of the light control member 48). A two-part prism 64 is mounted in front of the light-emitting diode 58, and in line with the portion 54' of graduated opacity. A simple reflecting mirror 66 is mounted above the prism 64 as shown in FIG. 1, and in line with the portion 56' of uniform opacity. The arrangement is such that the beam from the light-emitting diode 58 is split by the prism 64, and one half of the beam is directed through the variable opacity portion 54', striking the phototransistor 62. The other half of the split beam is reflected by the mirror 66 and directed through the portion 56' of uniform opacity, striking the other phototransistor 60. The portions 54' and 56' thus modulate the beam parts passing through them. In the case of the portion 54' of graduated opacity, the modulation is in the nature of an increase or reduction in energy received by the one phototransistor 62 associated therewith as the lever is moved, whereas in the case of the portion 56' of constant opacity, the modulation is in the nature of a mere reduction in energy received by the phototransistor 60 associated therewith, regardless of the movement of the sector.

In FIG. 1, the sector 48 is shown in elevation at the rear of the swivel members 36, 38 and lever 14. The other sector 48' is shown in section. The sector 48' operates in conjunction with the light-emitting diode 58, prism 64, mirror 66, and phototransistors 60, 62, and these components are shown within a box illustrated in dotted outline, indicated 68. A similar box 70 in dotted outline is shown at the location of the sector 48, and contains the same components as the first-mentioned box 68, namely, a light-emitting diode, prism, mirror, and two phototransistors (these latter components have been omitted from the drawings, for clarity).

Further, in accordance with the invention, there is associated with the phototransistors 60, 62 and the light-emitting diode 58, comparator amplifier circuitry which accepts the outputs from each phototransistor 60, 62 and provides an electrical output signal or voltage which is proportional to the angular position of the lever 14. One comparator amplifier 72 having an output terminal 74 is illustrated in FIG. 4. It will be understood that the circuit shown in this figure is employed with the two phototransistors 60, 62 associated with the sector 48', while a second amplifier, not shown, identical to that of FIG. 4, operates with the phototransistors and light-emitting diode associated with the sector or light-control member 48. It will be further seen that each one of the various angular positions that the lever 14 can occupy will give rise to a single pair of output signal or voltage levels, one level from terminal 74 of the comparator amplifier 72 corresponding to the light control member 48' and one level from terminal 74 of the comparator amplifier 72 corresponding to the light control member 48. These two output levels will correspond to an x-axis coordinate reading and a y-axis coordinate reading, respectively.

Referring again to FIG. 4, there is shown schematically the light-emitting diode 58 having a series resistor 76, and the phototransistors 60, 62 each having one terminal connected to a source of voltage +V, with their other terminals respectively connected through variable resistors 78, 80 to ground. The junction of the emitter of the one phototransistor 60 and the resistor 78 is characterized by a generally constant voltage, since it is derived from the beam part passing through the monotonous portion 56' of the light control member 48'. A by-pass capacitor 82 reduces any stray noise at this point. The voltage in turn is fed to an input resistor 84, and drives the inverting input of an operational amplifier 86. The operational amplifier has a feedback resistor 88 which, together with the input resistor 84, determine the voltage gain of the stage 86. A biasing potentiometer 90 connected between the source of voltage +V and ground, is fed to the non-inverting input. Adjustment of resistors 78 and 80 is made with the joystick lever 14 precisely in its center position, to provide a predetermined, desired output voltage at terminal 74. Resistor 90 can then be set to provide a desired operating intensity for the light-emitting diode 58. This latter adjustment can be made without disturbing the adjustments previously made to resistors 78 and 80. With this arrangement, changes in the position of the lever 14 along the y axis will result in corresponding changes in the voltage appearing on terminal 74, and similarly changes in the x axis position of the lever will result in corresponding changes in the voltage appearing on the terminal corresponding to that indicated 74 of the other amplifier associated with sector 48.

The above arrangement has the following important advantages. By initially calibrating the amplifier circuit of FIG. 4 for the condition where the joystick lever 14 is precisely in its center, there are minimized errors which would otherwise arise during operation of the device, such errors resulting from drift in the parameters of the various components, i.e. the light-emitting diode 58 or the phototransistors 60, 62, or clouding of the prism 64, etc. Such component drift is well known in the art. In particular, solid state devices such as light-emitting diodes and phototransistors exhibit significant drift in their characteristics as they age. More pronounced, however, is the drift which occurs with changes in temperature. With the present arrangement component drift is compensated for, since such deviations appear in the form of what are known as "common mode" changes; that is, changes which occur in such a manner as to balance out one another. For example, a decrease in the intensity of light emitted by the light-emitting diode 58 will be sensed by the amplifier 86, through the one phototransistor 60, causing the amplifier 86 to increase its output drive to the light-emitting diode 58, in an effort to compensate for such drift. Also, even though a precise compensation may not be achieved, the initial change in light-output will be detected by both phototransistors 60, 62 and applied as a common mode signal to both the inverting and non-inverting input terminals of amplifier 72. Since this type of amplifier responds to the difference in signals applied between its inputs and not to the absolute value of such signals with respect to ground, the amplifier's output 74 will change very little in response to such a common mode change. In fact, modern integrated circuit amplifiers specify what is known as a "common mode rejection ratio", which is a measure of the ability of such a device to reject changes that are applied simultaneously to both inputs.

As another example, if there occurs a change in the response of either phototransistor 60, 62 due to aging or temperature, it is likely that each unit will change in a similar fashion, with respect to magnitude and direction, especially if the units were selected from the same manufacturing "batch". Such similar changes in the outputs of the phototransistors 60, 62 are also applied to the amplifier 72 as a "common mode signal", and thus are rejected to a large degree.

Other changes in the light transmission between the light-emitting diode 58 and the phototransistors 60, 62, such as clouding of the prisms 64, will similarly be sensed by both phototransistors and processed as common mode signals, thus not affecting the accuracy of the electrical readings that are being monitored and which correspond to the angular position of the joystick lever.

By this invention it has been discovered that by making the opacity of the monotonous portion 56 the same as that of the graduated opacity portion 54 at the centralized location of its phototransistor, with the joystick lever precisely in the center of its range, there is significantly improved the accuracy obtainable with the system operating in this center area, i.e. where the deviations from center are between zero and plus or minus 10 degrees or so, as compared with that of prior systems of different construction. Significantly better accuracy and repeatability are thus obtainable.

Another embodiment of the invention is illustrated in FIG. 5, showing an arrangement which is intended to be substituted for portions of the construction of FIGS. 1-3. There is illustrated schematically a light-emitting diode 90 and a pair of phototransistors 92, 94 associated with one of the two light control members 48, 48' of the type incorporated in the device of FIGS. 1-3. By the invention, either one or both the light-emitting diode 90 and the phototransistors 92, 94 can be located remotely from the light control member 48'. There is provided a light-transmitting fiber optic cable device 96, or "light pipe" as it is sometimes referred to, associated with the light-emitting diode 90. The device 96 has a main branch 98 which receives radiation from the light-emitting diode 90, and two spaced branches 100, 102 such that the radiation from the main branch 98 is split and travels along each smaller branch 100, 102, and through translucent portions 54', 56' of the light control member 48'. Disposed at the opposite side of the member 48' is a pair of fiber optic cable devices 104, 106, one being aligned with the one branch 100 of the first fiber optic cable device 96, and the second 106 being aligned with the other branch 102 thereof. The remote ends of these extend to the phototransistors 92, 94 respectively. As can be readily understood, radiant energy received at the left ends of these cable devices 104, 106 is transferred directly to the phototransistors 92, 94. The latter can be arranged to drive a circuit similar to that of FIG. 4, with suitable adjustments made to compensate for a somewhat reduced intensity of light arriving at the phototransistors, as a result of small losses in the fiber optic cable devices.

The above arrangement has the distinct advantage that conventional electromagnetic signals of relatively low frequency, with their corresponding magnetic and electric fields, can be completely eliminated from the vicinity of the joystick. That is, all of the control functions at the location of the joystick are in the nature of very high frequency electromagnetic radiation (such as light), which is readily capable of being shielded. Such radiation has a frequency so far removed from that of conventional electronic signals as to cause no problems involving radio frequency interference (r. f. i.) to adjacent equipment. It is well known that the losses in such fiber optic lines can be maintained relatively low, whereby runs of hundreds or even thousands of feet are practical. Stated differently, with the arrangement of FIG. 5, the light-emitting diode, phototransistors, and amplifier circuitry (FIG. 4) can be located in a different room or even a different building with respect to the joystick control lever 14 and the other mechanical parts associated therewith. This capability can be of significant importance where freedom from radio frequency interference must be maintained at the location of the joystick.

Still another embodiment of the invention is shown in FIGS. 6-8. The light control member is indicated 48', and the light-emitting diode 58 and phototransistors 60, 62 are the same as those of the first embodiment. By the invention, there is associated with the light emitting diode 58 a mirror 108 which acts in such a way as to evenly split the beam from the light-emitting diode 58 into two equal parts, one being directed through the one portion of the member 48', and the other beam being directed through the second portion such that the beam parts arrive at the respective phototransistors 60, 62. It will be understood that the mirror 108 has two reflecting surfaces 110, 112, and that the mirror's position is adjusted such that beam splitting function results in directing of the two resulting beam parts toward the respective translucent portions of the member 48'. The mountings for the light-emitting diode 58, mirror 108 and phototransistors 60, 62 have been omitted from FIG. 6, for clarity. However, the parts are intended to be fixedly secured to suitable structures (not shown) that are immovable with respect to the base plate 12 of the joystick control. FIG. 7 illustrates a rear view of the mirror of FIG. 6, and FIG. 8 shows a mounting board 114 for the phototransistors, and the leads extending from the ends of the phototransistor casings.

The arrangement of FIGS. 6-8 is intended to be substituted for that of FIG. 1, with FIG. 6 showing those components which are illustrated in dotted outline at the lower right-hand area of FIG. 1.

From the above it can be seen that I have provided novel and improved joystick control devices which are both simple in their structure while at the same time being rugged and reliable in use. The arrangement whereby the light control member utilizes two separate translucent portions, one of graduated opacity and the other of substantially uniform opacity, constitutes a substantial improvement in compensating for component drift, and thus reducing errors that would otherwise appear. In addition, the center position of the joystick lever 14 can be determined with a high degree of accuracy and repeatability.

Instead of translucent portions in the sectors, there can be substituted slots in an opaque light control member, wherein one slot would be tapered and the other uniform; alternately, windows in an opaque light control member having coverings of plastic film having the desired characteristics could be employed, or suitably tinted glass.

Through the use of solid state optical transmitters and receivers, there is minimized the number of moving parts. Mechanical wear is thus reduced, resulting in improved reliability.

The disclosed devices are thus seen to constitute a distinct advance and improvement in the field of electromechanical controls.

Variations and modifications are possible without departing from the spirit of the invention.

Each and every one of the appended claims defines an aspect of the invention which is separate and distinct from all others, and accordingly each claim is intended to be treated in this manner when examined in the light of the prior art devices in any determination of novelty or validity.

I claim:

1. A joystick control comprising, in combination:
   (a) a lever,
   (b) means mounting said lever for swivelling movement in the directions of x and y axes,
   (c) a single energy source providing a beam of radiant energy,
   (d) means dividing said beam into two parts,
   (e) means responsive to movement of said lever in a direction of one of said axes, for varying the intensity of one of said beam parts between lower and higher values, and
   (f) means responsive to movement of said lever in a direction of said one axis, for effecting from the other of said beam parts, a reduced-energy beam of predetermined constant value between said lower and higher values,
   (g) said intensity-varying means being adapted to produce, when said lever is disposed perpendicularly with respect to the said one axis, a resultant beam of intermediate intensity having solely one fixed relationship to the intensity of said reduced-energy beam.

2. A control as set forth in claim 1, wherein:
   (a) the energy source produces a beam of light.

3. A control as set forth in claim 2, wherein;
   (a) said energy source comprises a light-emitting diode.

4. A control as set forth in claim 3, wherein:
   (a) said means for dividing the beam comprises a pair of prisms.

5. A control as set forth in claim 3, wherein:
   (a) said means for dividing the beam comprises a pair of mirrors.

6. A control as set forth in claim 3, wherein:
   (a) said means for dividing the beams comprises a fiberoptic light pipe having a unitary input and a divided, two-part output.

7. A control as set forth in claim 1, wherein:
   (a) the means for varying the intensity of one of said beam parts comprises a member having an elongate translucent portion the opacity of which varies between lower and higher limits as it is traversed along its length, and
   (b) the means for effecting a reduced-energy beam of constant value comprises a member having an elongate translucent portion the opacity of which is constant as it is traversed along its length and which lies between said lower and higher limits.

8. A control as set forth in claim 7, wherein:
   (a) the translucent portions of said members are of arcuate configuration and different radii, and have a common center of curvature.

9. A control as set forth in claim 2, and further including:
   (a) light-sensors and amplifying circuits associated therewith, respectively responsive to said varied and said reduced-energy light beams, for effecting a control.

10. A control as set forth in claim 7, and further including:
    (a) a pair of pivoted guide quadrants respectively associated with said members and connected to said lever to be pivotally actuated thereby.

11. A control as set forth in claim 10, wherein:
    (a) said guide quadrants have slots, and said lever has an end portion slidable in said slots.

12. A control as set forth in claim 11, wherein:
    (a) said end portion of the lever has a square cross section closely fitted to said slots to prevent turning of the lever about its axis.

13. A control as set forth in claim 12, and further including:
    (a) a base member pivotally mounting said quadrants and having a centralized socket,
    (b) said lever having a shoulder intermediate its ends, received and confined in said socket.

14. An electromechanical control for producing an electrical output signal that varies as a function of the angular position of a manually engageable lever, comprising in combination:
    (a) a base and means pivotally mounting the lever on the base,
    (b) a source providing a beam of radiant energy,
    (c) a first and a second detector means, each being adapted to receive part of said beam, and
    (d) means mechanically coupled to said lever, for modulating the part of the beam received by one detector such that the energy received by the latter varies between a maximum and minimum value as the manually engageable lever is operated from one position, through a center position, and toward an opposite position with respect to the base, and for modulating the part of the beam received by the other detector such that the energy received by the latter remains constant at a value intermediate said maximum and minimum values, (e) the energy received by the one detector means being substantially equal to that received by the said other detector means only when the the manually engageable lever is disposed at its center position.

15. The invention as defined in claim 14, wherein:
(a) said mechanical means comprises a sector pivotally carried on the base, and a mechanical linkage disposed between the lever and the sector, and adapted to rotate the sector,
(b) said sector having two arcuate light-transmitting translucent portions, one of said portions having an area of graduated opacity along its length, and the other of said portions having an area of constant opacity along its length,
(c) the opacity of the said other translucent portion being substantially identical to that of the first translucent portion at a point near its center.

16. The invention as defined in claim 15, wherein:
(a) said first and second detector means comprise light-sensitive receiving devices disposed respectively at one side of said one translucent portion and said other translucent portion.

17. The invention as defined in claim 16, wherein:
(a) said source comprises a light-transmitting device disposed on the opposite sides of said translucent portions.

18. The invention as defined in claim 17, and further including:
(a) a mirror, and a prism disposed in path of the beam from said source, said prism passing a portion of said beam to said mirror and said mirror reflecting it toward the other translucent portion, and the prism reflecting a part of said beam toward said one translucent portion.

19. The invention as defined in claim 14, wherein:
(a) said pivotal mounting means comprises a ball joint between said base and lever.

20. The invention as defined in claim 17, wherein:
(a) said light-transmitting device comprises a light-emitting diode.

21. The invention as defined in claim 16, wherein:
(a) said light-sensitive receiving devices comprise phototransistors.

22. The invention as defined in claim 14, and further including:
(a) a fiber optic cable disposed between said source and said beam modulating means, whereby the source can be located remotely from the base.

23. The invention as defined in claim 14, and further including:
(a) a fiber optic cable disposed respectively between said first and second detector means, and said beam modulating means, whereby the said first and second detector means can be located remotely from the base.

24. The invention as defined in claim 15, wherein:
(a) said translucent portions comprise sheets of plastic film having the desired opacity characteristics.

25. A joystick control comprising, in combination:
(a) a lever,
(b) means mounting said lever for swivelling movement in the directions of x and y axes,
(c) a single energy source providing a beam of radiant energy,
(d) means dividing said beam into two parts,
(e) means responsive to movement of said lever in a direction of one of said axes, for varying the intensity of one of said beam parts between lower and higher values, and
(f) means responsive to movement of said lever in a direction of said one axis, for effecting from the other of said beam parts, a reduced-energy beam of predetermined constant value between said lower and higher values,
(g) said intensity-varying means being adapted to produce, when said lever is disposed at a given predetermined angle with respect to the said one axis, a resultant beam of intermediate intensity having solely one fixed relationship to the intensity of said reduced-energy beam.

26. An electromechanical control for producing an electrical output signal that varies as a function of the angular position of a manually engageable lever, comprising in combination:
(a) a base and means pivotally mounting the lever on the base,
(b) a source providing a beam of radiant energy,
(c) a first and a second detector means, each being adapted to receive part of said beam,
(d) means mechanically coupled to said lever, for modulating the part of the beam received by one detector such that the energy received by the latter varies between a maximum and minimum value as the manually engageable lever is operated from one position, through a center position, and toward an opposite position with respect to the base, and for modulating the part of the beam received by the other detector such that the energy received by the latter remains constant at a value intermediate said maximum and minimum values,
(e) the energy received by the one detector means being substantially equal to that received by the said other detector means only when the the manually engageable lever is disposed at a given predetermined position intermediate the said one position and the said opposite position.

* * * * *